Jan. 23, 1962     R. S. HALL     3,018,113
FLOATING LABYRINTH SEAL
Filed May 14, 1957
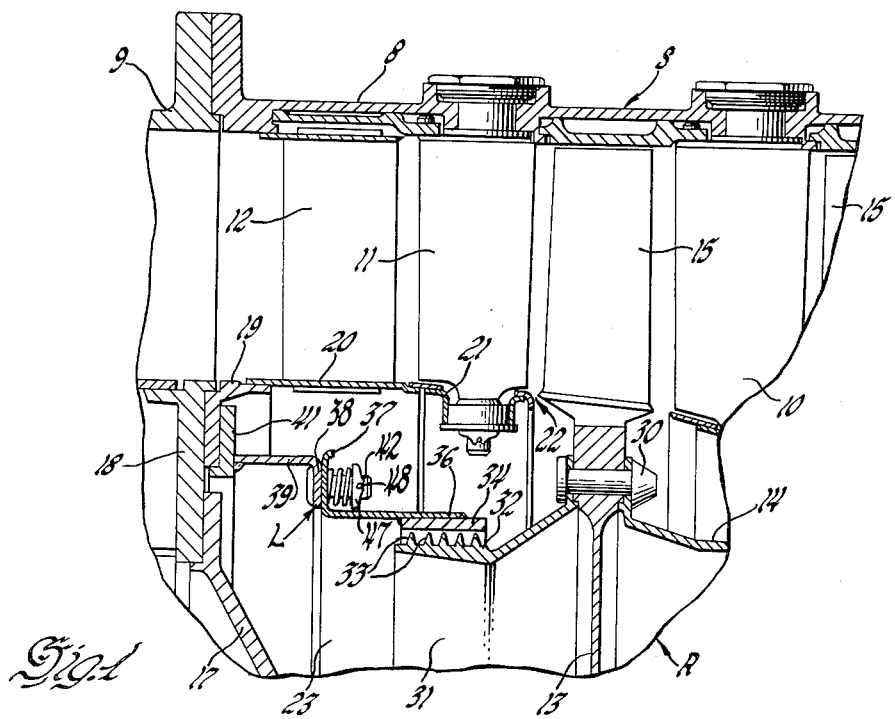
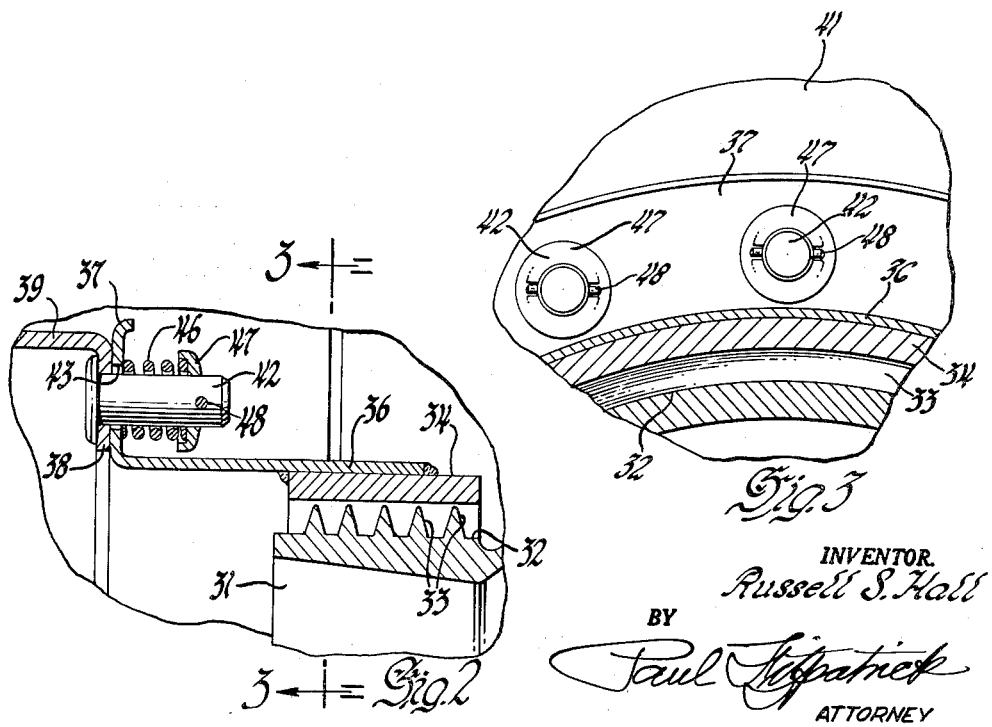
INVENTOR.
Russell S. Hall
BY Paul Fitzpatrick
ATTORNEY

United States Patent Office 3,018,113
Patented Jan. 23, 1962

3,018,113
FLOATING LABYRINTH SEAL
Russell S. Hall, Indianapolis, Ind., assignor to General Motors Corporation, Detroit, Mich., a corporation of Delaware
Filed May 14, 1957, Ser. No. 660,021
2 Claims. (Cl. 277—53)

My invention relates to seals for rotating machinery, and particularly to seals of the labyrinth type in which the sealing members are normally slightly out of contact with each other in operation. The invention is particularly applicable to seals of large diameter, such as are used in rotary compressors and turbines, but is also applicable to shaft seals for rotating machinery.

The invention is described in terms of its preferred embodiment in an axial-flow compressor and the advantages of the invention will be recited in terms of this environment. Axial-flow compressors for gas turbine engines ordinarily are of large size, ranging from a foot to over a yard in diameter. The parts rotate at high speed. Frequently, both the rotating and stationary parts are made as light as possible, with an attendant sacrifice of rigidity. In such cases, if the parts of a labyrinth seal are fixed to the rotor and stator of a compressor, distortion of the stator may close the gap between the parts of the labyrinth seal and cause rubbing of the parts. To obviate this difficulty by increasing seal clearances is unsatisfactory because the leakage of the seal increases.

My invention is directed to the provision of a seal in which the non-rotating part is mounted so that it can shift slightly in a plane transverse to the axis of the rotating part so that, if contact due to non-concentricity occurs, the stationary seal part will shift to center itself and thus prevent the wearing away of the parts by rubbing which would otherwise occur and which would cause an increase in seal clearance.

Preferably, also, the non-rotating seal part is the outer member of the seal and is mounted by a thin section member of such length as to provide a poor heat conduction path. Heat generated by rubbing contact of the seal will rapidly heat and expand the outer member to provide clearance sufficient to prevent rubbing.

The principal objects of the invention are to provide an improved seal structure, to provide a self-aligning minimum clearance seal of the labyrinth type, and to accomplish these objects with a simple and readily assembled structure.

The nature of the invention and the advantages thereof will be clear to those skilled in the art from the succeeding detailed description of the preferred embodiment thereof and the accompanying drawings.

FIGURE 1 is a partial sectional view of the discharge end of an axial-flow compressor incorporating the invention, the view being taken on a plane containing the axis of the compressor.

FIGURE 2 is a detail sectional view of the seal taken on the same plane as FIGURE 1.

FIGURE 3 is a transverse sectional view taken on the plane indicated by the line 3—3 in FIGURE 2.

Referring first to FIGURE 1, the compressor comprises a stator structure S and a rotor R. The labyrinth seal L of the invention seals between the rotating and stationary parts at the outlet of the compressor. The stator comprises a case 8 flanged at the discharge end for connection to an annular diffuser 9. Rows of stator vanes 10, 11, and 12 are mounted in the case 8. The stator vane structure, details of which are immaterial to the invention claimed here, is the subject of my U.S. Patent No. 2,972,441.

The rotor comprises a number of disks 13, only one of which is illustrated, connected by spacer rings 14 to provide a drum-shaped structure. Rotor blades 15 are mounted on the periphery of disks 13. The rotor R is supported in bearings (not shown), one of which may be mounted in the annular support 17 fixed to the flange 18 of the diffuser 9. A ring 19, L-shaped in cross-section, fixed to the flange 18, bridges the gap between the compressor and the inner shroud 20 of the last stage stator vanes 12, which are outlet guide vanes. Shroud 20 is connected to the inner shroud 21 of outlet guide vanes 11. In the operation of the compressor, air may leak through the gap 22 between the last stage rotor blades 15 and shroud 21. The labyrinth seal L is interposed between this gap and a chamber 23 within the rotor which is vented to atmosphere or some low pressure area. The venting of chamber 23 prevents exertion of a high pressure force on the compressor rotor and the seal minimizes the leakage to this low pressure chamber.

Considering now the structure and mounting of the seal, the inner part of the seal is a ring 31 fixed to the disk 13 by bolts 30 which also fix the disks to the spacer ring 14. Ring 31 includes a cylindrical peripheral portion 32 bearing labyrinth seal ribs 33. The peaks of these ribs are closely spaced from the inner surface of the outer stationary seal ring 34.

The clearance shown in the drawings is exaggerated for clarity. There may be no clearance when the engine is assembled, the ring 34 being slid or wrung over ribs 32. Frictional heat generated as soon as the compressor starts expands ring 34 to provide a very small operating clearance. Of course, the small clearance makes the seal more effective than if a larger clearance were provided.

Ring 34 is welded or brazed to an L-section ring 36, the flange 37 of which serves to mount the seal ring. The outer face of flange 37 is held in abutting relation with the adjacent face of the inwardly directed flange 38 of a fixed ring 39. Ring 39 is welded to a mounting flange 41 suitably fixed to the diffuser flange 18. Headed pins 42, fixed in the flange 38 and spaced circumferentially of the flange, pass through holes 43 in the flange 37. It will be noted that the holes 43 are larger in diameter than the pins, which normally pass through the center of the holes, so that the stationary seal ring 34 can shift slightly in a plane transverse to the axis of the rotor. Coil compression springs 46, mounted around the pins 42, bear against the inner face of flange 37. Abutments for these springs are provided by small flanged collars 47 slipped over the pins 42 and held in place by transverse pins or keys 48 mounted in diametric holes in pins 42. The springs exert a force pressing or biasing flange 37 against flange 38 so that the two flanges seal against each other and the seal ring 34 is frictionally restrained against lateral shifting. However, if the rotating seal ring engages ring 34, the latter will be moved slightly by this engagement so that the ribs 33 will not cut into the ring 34, and the clearance at the opposite side of the center of the seal is closed up by the shifting of ring 34.

The clearance betwen pins 42 and holes 43 also permits fitting outer seal ring 34 over the inner seal ring 32 notwithstanding the lack of clearance without imposing difficult dimensional tolerances on the stator structure including ring 39 which supports the ring 34. Ample tolerance is provided in the holes 43 to permit centering of the seal parts notwithstanding any normal dimensional inaccuracies of the supporting structure for the outer seal ring.

It will be noted that the cylindrical portion of ring 36 is relatively thin compared to the seal ring 34 and is of considerable axial extent between the ring 34 and flange 37. Preferably, this intermediate portion is of about the same width as the seal ring and, in any event, it is of sufficient length to provide a relatively long heat conduction path from ring 34 to support 39 and to separate the flange 37, which resists expansion, sufficiently from ring 34 that it does not interfere with the expansion of ring 34. The distance between the ring 34 and flange 37 in a typical installation may be of the order of one or two inches.

When the seal parts 32 rotate in contact with each other because of the close clearance, heat is rapidly generated. This heat is dissipated from the ribs 33 into the body 32. It is poorly dissipated from ring 34 because of the long thin annular path through ring 36. Ring 34 will expand slightly due to this frictional heating as the rotation begins to provide a free-running seal of low clearance.

Thus, the mounting for seal ring 34 provides both for expansion of the ring due to the contact of the seal parts around the circumference and for shifting of ring 34 if contact occurs at one side of the axis because of any distortion of the structure.

It will be noted that flange 37 is mounted on the high pressure face of flange 38 so that the pressure difference across the seal also biases the flange 37 into engagement with flange 38 when the compressor is operating.

The seal ring 34 may be mounted simply by putting it in place over pins 42, mounting the springs on the pins, pushing the retainers 47 in to compress the springs, and inserting keys 48, and may be removed by reversing this sequence.

It will be apparent to those skilled in the art that the structure described is particularly desirable as a seal for large diameter structures in which distortion may interfere with seal clearances.

The detailed description of the preferred embodiment of the invention for the purpose of explaining the principles thereof is not to be construed as restricting the invention, as various modifications may be made within the scope of the invention by the exercise of skill in the art.

I claim:

1. A labyrinth seal comprising, in combination, a body, an inner annular member rotatable therein, and an outer annular member mounted on the body adjacent to the first member and cooperating therewith to provide a labyrinth seal, at least one of said members having a ribbed seal surface, and means mounting the outer member on the body locating the outer member axially thereof, providing freedom of movement of the outer member transverse to the axis thereof in response to contact between said members, and providing a frictional restraint against transverse movement thereof, the said means comprising a part of the body having a radial face; circumferentially spaced pins extending from the part; a flange extending radially from the outer member and fixed thereto, the flange defining a radial face abutting the radial face on the body, one of said radial faces being plane; a ring extending axially from the outer member and connecting it to the said flange, the ring being of substantial axial length and of thin section relative to the thickness of the outer member so as to provide a poor heat conduction path from the outer member to the said flange and the body; the flange having openings therein receiving the pins with clearance for transverse movement of the second member, the pins extending through the flange openings; and compression springs retained on the pins engaging the flange and biasing the flange against the body.

2. A labyrinth seal comprising, in combination, a body, an inner annular member rotatable therein, and an outer annular member mounted on the body adjacent to the first member and cooperating therewith to provide a labyrinth seal, at least one of said members having a ribbed seal surface, and means mounting the outer member on the body locating the outer member axially thereof, providing freedom of movement of the outer member transverse to the axis thereof in response to contact between said members, and providing a frictional restraint against transverse movement thereof, the said means comprising a part of the body having a radial face; circumferentially spaced pins extending from the part; a flange extending radially from the outer member and fixed thereto, the flange defining a radial face abutting the radial face on the body, one of said radial faces being plane; the flange having openings therein receiving the pins with clearance for transverse movement of the second member, the pins extending through the flange openings; and compression springs retained on the pins engaging the flange and biasing the flange against the body; means defining two spaces normally containing fluid at mutually different pressure levels on opposite sides of and separated by the said labyrinth seal; the radial face on the body being directed toward the higher pressure side of the seal so that the pressure differential across the seal also biases the flange against the body.

References Cited in the file of this patent

UNITED STATES PATENTS

| | | |
|---|---|---|
| 846,747 | Kerr | Mar. 12, 1907 |
| 924,897 | Emmett | June 15, 1909 |
| 1,081,443 | Godfrey | Dec. 16, 1913 |
| 1,639,521 | MacMurchy | Aug. 16, 1927 |
| 2,547,300 | Wilson | Apr. 3, 1951 |